United States Patent
Lied et al.

(10) Patent No.: US 12,178,222 B2
(45) Date of Patent: Dec. 31, 2024

(54) MARINE PEPTIDE EMULSIONS

(71) Applicant: Firmenich SA, Geneva (CH)

(72) Inventors: Einar Lied, Bergen (NO); Oddvar Bjorge, Ellingsoy (NO)

(73) Assignee: Firmenich SA, Satigny (CH)

( * ) Notice: Subject to any disclaimer, the term of this patent is extended or adjusted under 35 U.S.C. 154(b) by 530 days.

(21) Appl. No.: 15/110,584

(22) PCT Filed: Jan. 8, 2015

(86) PCT No.: PCT/IB2015/000011
§ 371 (c)(1),
(2) Date: Jul. 8, 2016

(87) PCT Pub. No.: WO2015/104632
PCT Pub. Date: Jul. 16, 2015

(65) Prior Publication Data
US 2016/0324186 A1    Nov. 10, 2016

Related U.S. Application Data

(60) Provisional application No. 61/925,208, filed on Jan. 8, 2014.

(51) Int. Cl.
| | | |
|---|---|---|
| *A23J 1/04* | (2006.01) | |
| *A23D 7/00* | (2006.01) | |
| *A23J 3/34* | (2006.01) | |
| *A23L 17/00* | (2016.01) | |
| *A23L 35/00* | (2016.01) | |

(52) U.S. Cl.
CPC ............... *A23J 1/04* (2013.01); *A23D 7/003* (2013.01); *A23J 3/34* (2013.01); *A23L 17/70* (2016.08); *A23L 35/10* (2016.08); *A23V 2002/00* (2013.01)

(58) Field of Classification Search
CPC ..... A23V 2002/00; A23L 17/70; A23L 35/10; A23J 1/04; A23J 3/34
See application file for complete search history.

(56) References Cited

U.S. PATENT DOCUMENTS

2011/0039768 A1* 2/2011 Drieu La Rochelle ... A23J 3/04
514/4.9
2012/0238492 A1* 9/2012 Courois .................. A23J 3/341
514/4.8

FOREIGN PATENT DOCUMENTS

| FR | 2927335 | 8/2009 |
| JP | H11123052 A | 5/1999 |
| WO | WO2004071202 | 8/2004 |

OTHER PUBLICATIONS

McGill et al., "A Study of the Composition of Fish Liver and Body Oil Triglycerides". Lipids, vol. 27, No. 5 (1992) (Year: 1992).*
Shahidi et al., "Bioactives from Seafood Processing by-Products" from "Encyclopedia of Food Chemistry", vol. 3, pp. 280-288. (Year: 2019).*
Chibuike et al., "Food Protein-Derived Bioactive Peptides: Production, Processing, and Potential Health Benefits". Journal of Food Science vol. 71, No. 1, pp. 11-24. (Year: 2012).*
Carvalho et al., "Kinetic Study of The Enzymatic Hydrolysis of Sugarcane Bagasse". Brazilian Journal of Chemical Engineering vol. 30, No. 03, pp. 437-447, Jul.-Sep. 2013. (Year: 2013).*
International Search Report and Written Opinion, application PCT/IB2015/000011 mailed Mar. 9, 2015.

* cited by examiner

*Primary Examiner* — Donald R Spamer
*Assistant Examiner* — Assaf Zilbering
(74) *Attorney, Agent, or Firm* — Robert S. Dailey

(57) ABSTRACT

Provided herein are methods of making emulsions comprising triglycerides and a marine peptides wherein the method is carried out in the substantial absence of an added emulsifier.

7 Claims, No Drawings

MARINE PEPTIDE EMULSIONS

This application is a 371 filing of International Patent Application PCT/IB2015/000011 filed 8 Jan. 2015, which claims the benefit of U.S. patent application Ser. No. 61/925,208 filed 8 Jan. 2014.

FIELD

Provided herein are emulsions comprising marine peptides.

BACKGROUND

The use of marine raw materials for production of ingredients or sub-manufactured ingredients for applications in feeds, foods, pharmaceuticals or the fermentation industry is increasing. Underutilized marine raw materials represents new opportunities for making various refined products with functionality with high potential for applications in foods and feeds. Examples of such raw materials are by-products from fish, different species of crustaceans and marine evertebrate species. Such raw materials are particularly useful in making different forms of peptides, proteins and phospholipids.

Processing, by hydrolysis of fish raw materials and crustaceans like krill and shrimp, has been performed for several years; however, making such products high in fat that are also stable in the fluid form has been difficult because the fat fraction upon storage separates from the water soluble fraction within short period of time results in a heterogeneous three-phase product: triglycerides on top separated from the water phase by a thick and diffuse layer of various forms of lipid/peptide/protein aggregates.

SUMMARY

Working on alternative methodology based on enzymes and hydrolysis it was discovered that it is possible to provide a stable fluid product made from fish, parts of fish and crustaceans in the form of an emulsion without the need to add an emulsifier.

Provided herein is a method of making an emulsion comprising a triglyceride and a marine peptide comprising:
i. mixing a biological marine material with water to form a water and biological marine material mixture; and
ii. hydrolyzing the peptide and triglyceride mixture in the presence of the catalyst;
iii. heating the mixture to a temperature sufficient to inactive the catalyst; wherein the process is carried out in the substantial absence of an added emulsifier.

In a further embodiment, the triglycerides are provided in an amount of up to about 50%, by weight, of the total weight of a peptide triglyceride mixture.

In one embodiment, the catalyst is selected from the group consisting of an enzyme, a peptidase and a protease. In a particular embodiment, the catalyst is selected from group consisting of Protamex, Kojizyme, Alcalase, Flavorzyme, Neutrase, and Papain.

Provided herein is an emulsion provided in the substantial absence of an added emulsifier particularly less than 1%, more particularly less than 0.5%, even more particularly less than 0.1%, even more particularly no emulsifier by weigh of the total weight of the emulsion. Further provided herein is a marine peptide emulsion provided in the substantial absence of an added emulsifier particularly less than 1%, more particularly less than 0.5%, even more particularly less than 0.1%, even more particularly no emulsifier by weigh of the total weight of the emulsion. In one embodiment, the emulsion is provided, by weight, with at least 50% fat. In another aspect, the fat is provided in the form of a triglyceride.

DETAILED DESCRPTION

For the Summary, Description and Claims, the use of "or" means "and/or" unless stated otherwise. Similarly, "comprise," "comprises," "comprising" "include," "includes," and "including" are interchangeable and not intended to be limiting. It is to be further understood that where descriptions of various embodiments use the term "comprising," those skilled in the art would understand that in some specific instances, an embodiment can be alternatively described using language "consisting essentially of" or "consisting of".

In one embodiment, a stable emulsion is provided. Typically during hydrolysis of polypeptides to make peptides, a fat fraction separates from the water phase in the form of an oil within a short period of time after the peptides are stored. In one embodiment, a stable emulsion is provided herein wherein a fat fraction of an emulsion does not separate from the water phase after about three (3) minutes at about 5° C.

Working on alternative methodology, based on enzymes and hydrolysis, it was discovered that it was possible to stabilize a product, more particularly a final product, in the form of an emulsion without adding any kind of emulsifier to the product even when the product contained 50% of fat in the form of triglycerides. This was unexpected since usually, when hydrolysis is applied to make peptides, the fat fraction separates from the water phase in the form of an oil within a short period of time after storage. This unexpected finding comprises a method using hydrolysis to make a stable triglyceride and protein emulsion without using emulsifiers from raw materials from fish and crustaceeans and which is stable for long time and can be kept without any bacterial growth. In one embodiment, an emsulsion does not have any bacterial growth for about 60 days at 20° C. The product from the process is well suited for food and feed applications, and for further processing in the wet format as well as for making a dry product. The emulsions provided herein may provide several beneficial biological effects including as nutritional materials.

It has been found that hydrolysis of marine raw material from fish and crustaceans using proteases or peptidases results in a product in which the fat fraction is stabilized together with a protein wherein the fat fraction of the biological material mixture is not separated from the water fraction into a separate lipid fraction upon storage. The stable emulsion from biomass processing can be used for further processing to make proteins and lipids including phospholipids as well as specific phospholipids and fatty acids. This process and the stable fluid product simplifies the making of new specialized products for foods and feeds as well as products for food and feed supplements.

In one embodiment provided herein is the use of a protease, peptidase, or an enzyme to process: fish, fish parts, crustaceans, crustaceans parts, evertebrates or evertebrate parts. The processes provided herein makes it possible to stabilize a fat fraction together with protein in a biological material mixture thereby achieving an emulsion like composition with a fat content of up to 50% which stays homogenous over time at temperatures above 0° C. In another embodiment, an emulsion is provided which cannot be separated into a fat and water phase by decanting. It is possible, by this process, to make a stabile homogenous fat and protein rich material in the form of a fluid. This composition is suitable for use in making foods and feeds, or which may be used for further processing to make different types of proteins, peptides or lipids, or fractions thereof.

In one embodiment the process may comprise fresh or frozen, whole or minced biological material mixed with water for example but not limited to an incubate after which the temperature of the incubate is brought to a predetermined temperature optimal for the enzyme or enzyme cocktail used for this purpose. Thereafter the enzyme or enzyme cocktail is added to the mixture and is incubated for about 30 to 90 minutes, more particularly at 45 min while stirring at a speed from 2 to 200 revolutions per minute, more particularly from 10 to 200 revolutions per minute.

In one embodiment, the hydrolysis step is carried out at a temperature that ranges from about 40° C. to about 60° C., more particularly at about 55° C.

In one embodiment, the mixture is heated to inactivate the catalyst. In one embodiment, the mixture is heated to greater than 85° C. for at least 15 minutes, more particularly for at least 45 minutes.

When the raw materials are crustaceans the liberated exoskeleton is separated by filtering of an incubate; likewise, when the raw material is fish or parts of fish containing bone.

The temperature of a deshelled or bone free incubate may be brought to minimum 80° C. and kept at that temperature for at least 5 minutes, more particularly at 10 minutes to inactivate the enzymes used in the process. The inactivated incubate may be used as such or be taken through a dehydration process to make a concentrate in the fluid form with the same relative composition of protein and fat measured as N (nitrgent)×6.25 and according to Bligh & Dyer, respectively.

In one embodiment, provided herein is a process comprising the enzymatic hydrolysis of marine raw materials, which the use of protein and peptide digesting enzymes to make a stable composition of protein and lipids in the form of a fluid product wherein the raw material is selected from the group consisting of fish, parts of fish and crustaceans.

In one embodiment, according to the above process, the process is used for the manufacture of proteins.

In one embodiment, according to the above process, the process is used for the manufacture of peptides In one embodiment, according to the above process, the process is used for the manufacture of lipids.

In one embodiment, according to the above process, the process is used to manufacture is used for the manufacture of compositions of peptides, proteins, lipids and carbohydrates.

In one embodiment, according to the above process, the process is used for the manufacture of compositions of proteins.

In one embodiment, according to the above process, the process is used for the manufacture of compositions of peptides.

In one embodiment, according to the above process, the process is used for the manufacture of compositions of proteins and lipids.

In one embodiment, according to the above process, the process is used for the manufacture of compositions of peptides, proteins and lipids.

In one embodiment, according to the above process, the process is used for the manufacture of phospholipids.

In one embodiment, according to the above process, the process is used for the manufacture of fatty acids.

In one embodiment, according to the above process the process is part of a process for the manufacture of a composition selected from the group consisting of a food supplement, a health food, a food ingredient, of a pharmaceutical product, a feed ingredient and a feed supplement.

In one embodiment, provided here is a use of the emulsions provided herein in products suitable for consumption by mammals, more particularly humans.

What is claimed is:

1. A method of making a stable emulsion from biological marine materials, the method comprising:
   a) providing a biological marine material comprising triglycerides and marine peptides, and mixing the biological marine material with water to form a biological marine material mixture comprising the biological marine material and water;
   b) heating the biological marine material mixture in the presence of a catalyst while stirring at a speed of 10 to 200 revolutions per minute to form a marine hydrolysate mixture comprising a hydrolysate of the marine peptides, the triglycerides, and the catalyst, wherein the marine hydrolysate mixture is in the form of an emulsion, and wherein the marine hydrolysate mixture comprises no more than 1% by weight an added emulsifier; and
   c) inactivating the catalyst in the marine hydrolysate mixture.

2. The method of claim 1, wherein the catalyst comprises a peptidase or a protease.

3. The method of claim 1, wherein the biological marine material comprises fish, fish parts, crustaceans, crustacean parts, evertebrates, evertebrate parts, or combination thereof.

4. The method of claim 3, wherein the biological marine material comprises fish, fish parts, or combination thereof.

5. The method of claim 3, wherein the biological marine material comprises crustaceans, crustacean parts, or combination thereof.

6. The method of claim 1, wherein the emulsion is homogeneous.

7. The method of claim 1, wherein the inactivating comprises heating the marine hydrolysate mixture to a temperature greater than 85° C. for a period of at least 15 minutes.

* * * * *